(12) United States Patent
Okamoto et al.

(10) Patent No.: US 10,408,105 B1
(45) Date of Patent: Sep. 10, 2019

(54) SUPPORT FOR ELECTRIC HEATING TYPE CATALYST

(71) Applicant: NGK INSULATORS, LTD., Nagoya-Shi (JP)

(72) Inventors: Naoki Okamoto, Nagoya (JP); Naoya Takase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/299,776

(22) Filed: Mar. 12, 2019

(30) Foreign Application Priority Data

Mar. 29, 2018 (JP) ................. 2018-065721

(51) Int. Cl.
  *F01N 3/20* (2006.01)
  *F01N 3/28* (2006.01)
  *B01D 53/94* (2006.01)

(52) U.S. Cl.
  CPC ........... *F01N 3/2026* (2013.01); *B01D 53/94* (2013.01); *F01N 3/281* (2013.01)

(58) Field of Classification Search
  CPC ...... F01N 3/2026; F01N 3/2828; F01N 3/005; B01D 52/94
  USPC .................. 422/174, 180; 219/552
  See application file for complete search history.

(56) References Cited

U.S. PATENT DOCUMENTS

| | | | | |
|---|---|---|---|---|
| 5,245,825 A * | 9/1993 | Ohhashi | ............. | B01D 53/9454 |
| | | | | 219/552 |
| 5,288,975 A * | 2/1994 | Kondo | ................. | B01J 35/0033 |
| | | | | 219/552 |
| 8,716,635 B2 * | 5/2014 | Noguchi | .................. | B01J 35/04 |
| | | | | 219/553 |
| 8,803,043 B2 * | 8/2014 | Sakashita | .............. | F01N 3/2828 |
| | | | | 219/553 |
| 2011/0250096 A1 * | 10/2011 | Ido | ........................ | F01N 3/0222 |
| | | | | 422/177 |
| 2012/0121476 A1 | 5/2012 | Kinoshita et al. | | |
| 2013/0140295 A1 * | 6/2013 | Yoshioka | ................ | F01N 3/005 |
| | | | | 219/520 |

(Continued)

FOREIGN PATENT DOCUMENTS

| | | |
|---|---|---|
| JP | 5246337 B2 | 7/2013 |
| WO | 2013/146955 A1 | 10/2013 |

*Primary Examiner* — Tom P Duong
(74) *Attorney, Agent, or Firm* — Burr & Brown, PLLC

(57) ABSTRACT

A support for an electric heating type catalyst includes: a honeycomb structure having: porous partition walls extending through the honeycomb structure from an inflow end face to an outflow end face to define a plurality of cells forming a through channel; and an outer peripheral wall located at the outermost periphery; a pair of electrode layers disposed on the outer peripheral wall of the honeycomb structure; and a pair of electrode portions. Each of the electrode layers is formed in a strip shape extending in an extending direction of the cell of the honeycomb structure. In a cross section orthogonal to the extending direction of the cell, one electrode layer of the pair of electrode layers is disposed on a side opposite to the other electrode layer across a center of the honeycomb structure. Each of the electrode layers is electrically connected to each of the electrode portions via two or more base layers, and the base layers have conductivity and are spaced apart from each other. Each of the electrode portions includes two or more electrodes, and each of the electrodes is fixed to outer surfaces of the base layers.

11 Claims, 6 Drawing Sheets

(56) References Cited

U.S. PATENT DOCUMENTS

| | | | |
|---|---|---|---|
| 2015/0030510 A1 | 1/2015 | Mase et al. | |
| 2015/0158016 A1* | 6/2015 | Mori | F01N 3/2026 422/174 |
| 2016/0096777 A1* | 4/2016 | Izumi | B32B 9/005 428/116 |
| 2016/0346776 A1* | 12/2016 | Omiya | C04B 41/5059 |

* cited by examiner

[FIG. 1]
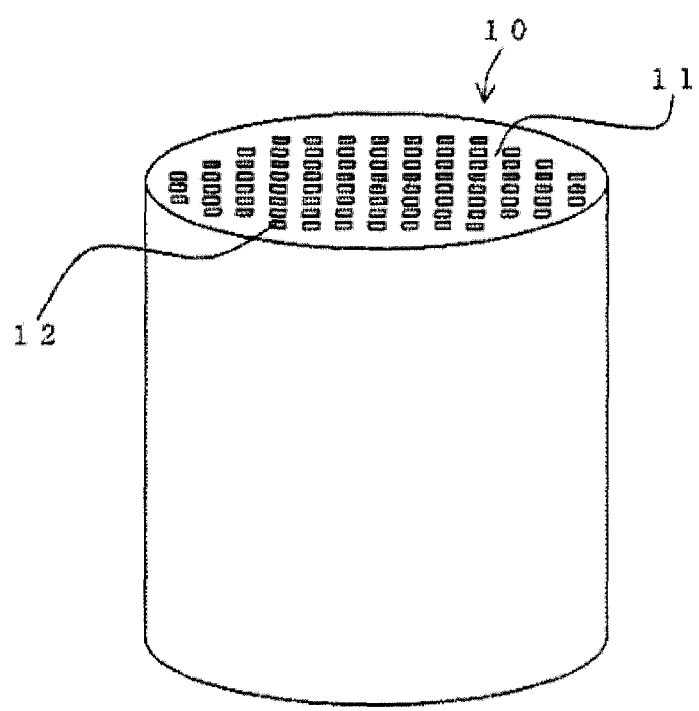

[FIG. 2]
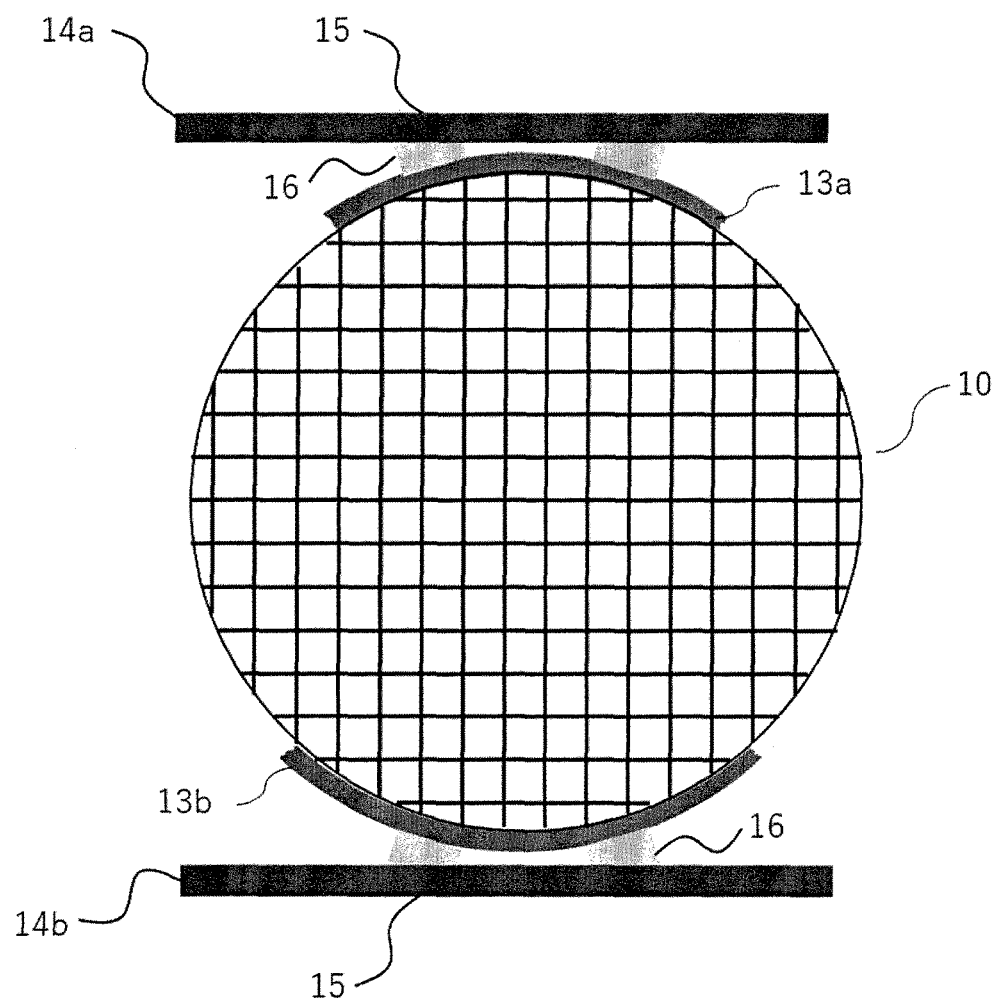

[FIG. 3]
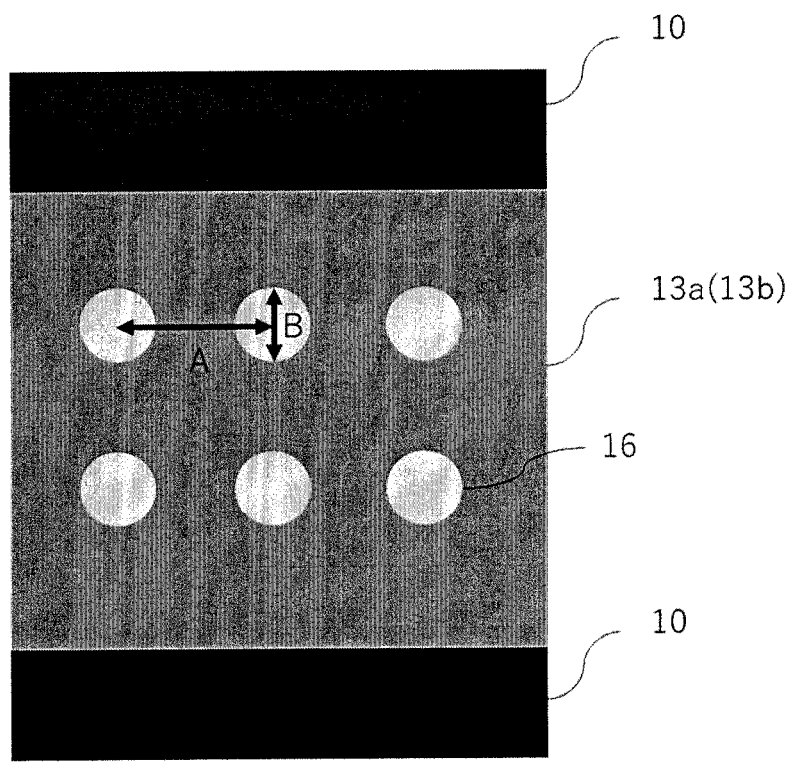

[FIG. 4]
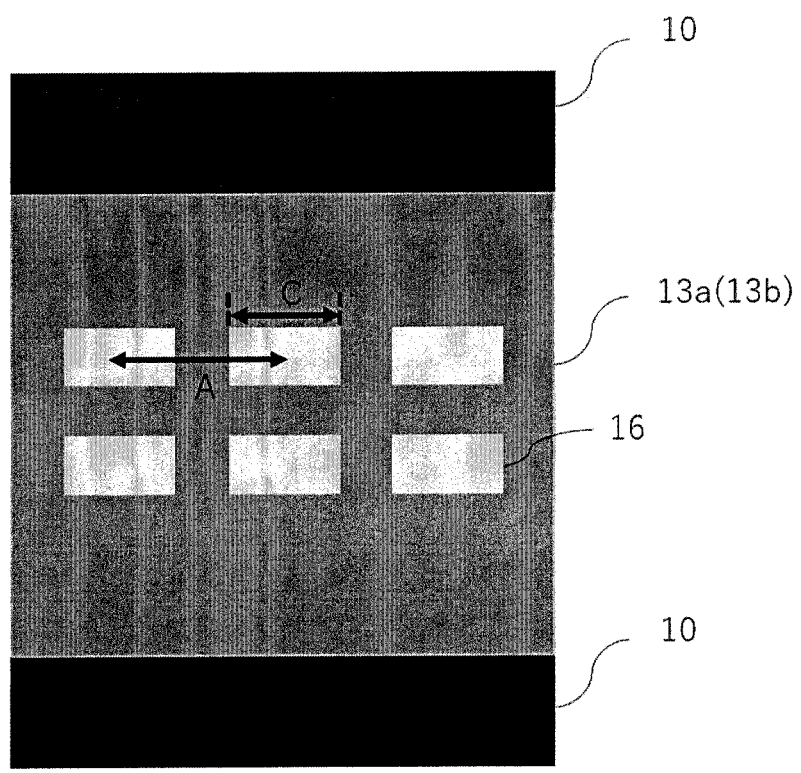

[FIG. 5]
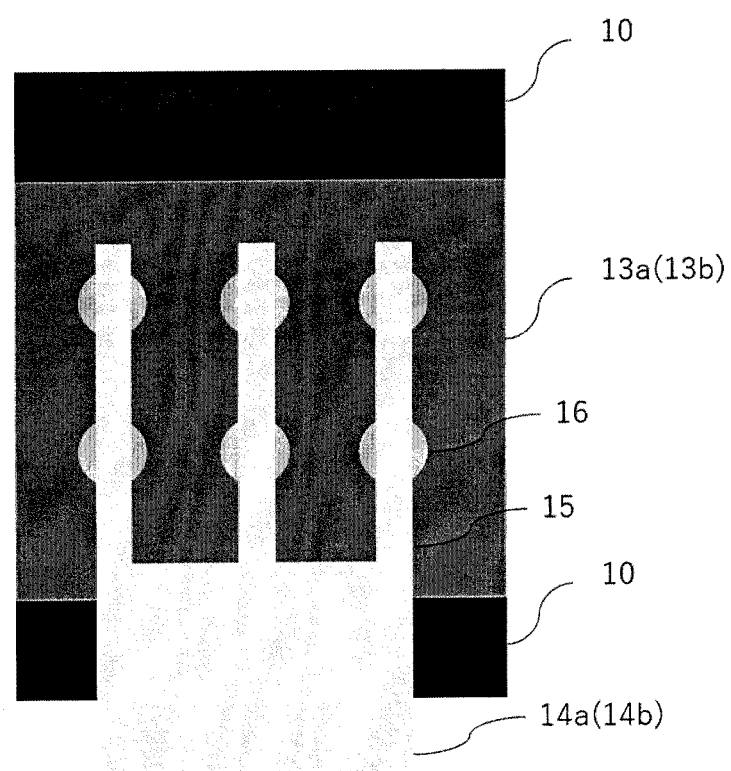

[FIG. 6]
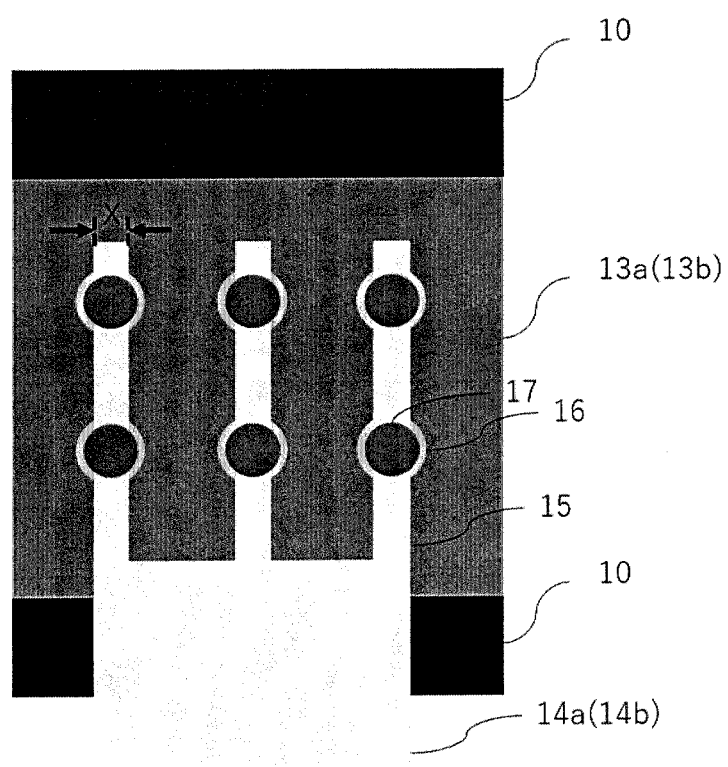

SUPPORT FOR ELECTRIC HEATING TYPE CATALYST

TECHNICAL FIELD

The present invention relates to a support for an electric heating type catalyst. More particularly, the present invention relates to a support for an electric heating type catalyst including: a honeycomb structure; electrode layers; and metal electrode portions, the electrode layers and the electrode portions being electrically connected via base layers, in which generation of cracks in the base layers can be effectively suppressed.

Conventionally, a member in which a catalyst is supported on a honeycomb structure made of cordierite or silicon carbide is used for treatment of harmful substances in exhaust gases discharged from motor vehicle engines (see, Patent Document 1). Such a honeycomb structure generally has a pillar shaped honeycomb structure that includes partition walls defining a plurality of cells extending from one end face to the other end face to form flow paths for an exhaust gas.

For the treatment of the exhaust gas with the catalyst supported on the honeycomb structure, a temperature of the catalyst is required for being increased to a predetermined temperature. However, as the engine is started, the catalyst temperature is lower, conventionally causing a problem that the exhaust gas is not sufficiently purified. Therefore, a system called an electric heating catalyst (EHC) has been developed. In the system, electrodes are disposed on a honeycomb structure made of conductive ceramics and the honeycomb structure itself generates heat by electric conduction, whereby the temperature of the catalyst supported on the honeycomb structure is increased to an activation temperature before or during starting of the engine.

Patent Document 1 proposes a honeycomb structure which is a catalyst support and also functions as a heater by applying a voltage, and which can suppress a bias of a temperature distribution when a voltage is applied. More particularly, it proposes that the bias of the temperature distribution generated when the voltage is applied is suppressed by disposing a pair of electrode portions in the form of strip on a side surface of the pillar shaped honeycomb structure in an extending direction of a cell of the honeycomb structure, and disposing one electrode portion of the pair of electrode portions on a side opposed to the other electrode portion of the pair of electrode portions across a center of the honeycomb structure, in a cross section orthogonal to the extending direction of the cell.

To satisfy sufficient electrical contact performance for the honeycomb structure, the electrode portions should be sufficiently bonded to the honeycomb structure. As one approach to achieve this, Patent Document 2 discloses a technique of forming a base layer between an electrode layer and a metal electrode for relaxing a difference in thermal expansion, in order to avoid cracking or breakage at a metal electrode boundary surface between the electrode layer and the electrode portion.

CITATION LIST

Patent Literatures

Patent Document 1: WO 2013/146955 A1
Patent Document 2: Japanese Patent No. 5246337 B

SUMMARY OF INVENTION

However, when the base layers are formed on the entire area where the metal electrodes are fixed, there is a problem that a temperature difference occurs between the base layer on which the metal electrode is fixed and the base layer on which the metal electrode is not fixed, thereby generating cracks in the base layers. The generation of cracks in the base layers may result in peeling off of the base layers due to vibration during use of a motor vehicle, or inhibition of expected current flowing, and also leads to unwanted appearance. Therefore, there would be a need for preventing the cracks in the base layers by alleviating the temperature difference, while maintaining a function of alleviating a thermal expansion difference as the base layer.

The present invention has been made in view of the above problems. An object of the present invention is to provide a support for an electric heating type catalyst including: a honeycomb structure; electrode layers; and metal electrode portions, the electrode layers and the electrode portions being electrically connected via base layers, in which generation of cracks in the base layers can be effectively suppressed.

As a result of intensive studies, the present inventors have found that the above problems can be solved by controlling the shape, arrangement, and the like of each base layer. Thus, the present invention is specified as follows:

(1)

A support for an electric heating type catalyst, comprising:
 a honeycomb structure having:
  porous partition walls extending through the honeycomb structure from an inflow end face to an outflow end face to define a plurality of cells forming a through channel;
  an outer peripheral wall located at the outermost periphery;
 a pair of electrode layers disposed on the outer peripheral wall of the honeycomb structure; and
 a pair of electrode portions,
 wherein each of the electrode layers is formed in a strip shape extending in an extending direction of the cells of the honeycomb structure,
 wherein, in a cross section orthogonal to the extending direction of the cell, one electrode layer of the pair of electrode layers is disposed on a side opposite to the other electrode layer across a center of the honeycomb structure,
 wherein each of the electrode layers is electrically connected to each of the electrode portions via two or more base layers, the base layers having conductivity and being spaced apart from each other, and
 wherein each of the electrode portions comprises two or more electrodes, each of the electrodes being fixed to outer surfaces of the base layers.

(2)

The support for the electrical heating type catalyst according to (1), wherein a contact surface between each of the base layers and the electrode is circular, and a pitch A between the base layers and a diameter B of each of the base layers satisfy the relationship: B/A≤0.9.

(3)

The support for the electric heating type catalyst according to (2), wherein the pitch A between the base layers and the diameter B of each of the base layers satisfy the relationship: B/A≤0.7.

(4)

The support for the electric heating type catalyst according to (1), wherein a contact surface between each of the base layers and the electrode is rectangular, and a pitch A between the base layers and a long side C of each of the base layers satisfy the relationship: $C/A \leq 0.9$.

(5)

The support for the electric heating type catalyst according to (4), wherein the pitch A between the base layers and the long side C of each of the base layers satisfy the relationship: $C/A \leq 0.7$.

(6)

A support for an electric heating type catalyst, comprising:
a honeycomb structure having:
porous partition walls extending through the honeycomb structure from an inflow end face to an outflow end face to define a plurality of cells forming a through channel;
a pair of electrode layers disposed on the outer peripheral wall of the honeycomb structure; and
a pair of electrode portions,
wherein each of the electrode layers is formed in a strip shape extending in an extending direction of the cell of the honeycomb structure,
wherein, in a cross section orthogonal to the extending direction of the cell, one electrode layer of the pair of electrode layers is disposed on a side opposite to the other electrode layer across a center of the honeycomb structure,
wherein each of the electrode layers is electrically connected to each of the electrode portions via two or more base layers, the base layers having conductivity and being spaced apart from each other, and
wherein each of the electrode portions comprises two or more electrodes, each of the electrodes being fixed to outer surfaces of the base layers by fixing layers.

(7)

The support for the electrical heating type catalyst according to (6), wherein a contact surface between each of the base layers and the electrode is circular, and a pitch A between the base layers and a diameter B of each of the base layers satisfy the relationship: $B/A \leq 0.9$.

(8)

The support for the electric heating type catalyst according to (7), wherein the pitch A between the base layers and the diameter B of each of the base layers satisfy the relationship: $B/A \leq 0.7$.

(9)

The support for the electric heating type catalyst according to (6), wherein a contact surface between each of the base layers and the electrode is rectangular, and a pitch A between the base layers and a long side C of each of the base layers satisfy the relationship: $C/A \leq 0.9$.

(10)

The support for the electric heating type catalyst according to (9), wherein the pitch A between the base layers and the long side C of each of the base layers satisfy the relationship: $C/A \leq 0.7$.

(11)

The support for the electric heating type catalyst according to any one of (6) to (10), wherein each of the base layers has a surface roughness Ra of 3 μm or more.

According to the present invention, the support for the electric heating type catalyst including: a honeycomb structure; electrode layers; and metal electrode portions, the electrode layers and the electrode portions being electrically connected via base layers, can effectively suppress generation of cracks in the base layers.

BRIEF DESCRIPTION OF DRAWINGS

FIG. 1 is a view showing an example of a honeycomb structure according to the present invention.

FIG. 2 is a cross-sectional view of a support for an electric heating type catalyst according to an embodiment of the present invention.

FIG. 3 is a view showing arrangement of base layers according to an embodiment of the present invention.

FIG. 4 is a view showing arrangement of base layers according to another embodiment of the present invention.

FIG. 5 is a view showing a fixed state of electrode portions according to an embodiment of the present invention.

FIG. 6 is a view showing a fixed state of electrode portions according to another embodiment of the present invention.

DESCRIPTION OF THE PREFERRED EMBODIMENTS

Hereinafter, embodiments of a support for an electrically heating type catalyst according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure)

FIG. 1 is a view showing an example of a honeycomb structure in the present invention. The honeycomb structure 10 includes: porous partition walls 11 extending through the honeycomb structure 10 from an inflow end face to an outflow end face to define a plurality of cells 12 forming a through channel and an outer peripheral wall located at the outermost periphery. The number, arrangement, shape and the like of the cells 12, as well as the thickness of each partition wall 11, and the like, are not limited and may be optionally designed as required.

A material of the honeycomb structure 10 is not particularly limited as long as it has conductivity, and metals, ceramics and the like may be used. In particular, from the viewpoint of compatibility of heat resistance and conductivity, preferably, the material of the honeycomb structure 10 is mainly based on a silicon-silicon carbide composite material or silicon carbide, and more preferably, it is a silicon-silicon carbide composite material or silicon carbide. Tantalum silicide ($TaSi_2$) and chromium silicide ($CrSi_2$) may also be added to lower the electric resistivity of the honeycomb structure. The phrase "the honeycomb structure 10 is mainly based on a silicon-silicon carbide composite" means that the honeycomb structure 10 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure.

The electric resistivity of the honeycomb structure 10 may be set as needed depending on voltage to be applied, including, but not particularly limited to, for example from 0.001 to 200 Ω·cm, for example. For a higher voltage of 64 V or more, it may be from 2 to 200 Ω·cm, and typically from 5 to 100 Ω·cm. Further, for a lower voltage of less than 64 V, it may be from 0.001 to 2 Ω·cm, and typically from 0.001 to 1 Ω·cm, and more typically from 0.01 to 1 Ω·Cm.

Each partition wall 11 of the honeycomb structure 10 preferably has a porosity of from 35 to 60%, and more preferably from 35 to 45%. The porosity of less than 35% may result in larger deformation during firing. The porosity of more than 60% may result in decreased strength of the honeycomb structure. The porosity is a value measured by a mercury porosimeter.

Each partition wall 11 of the honeycomb structure 10 preferably has an average pore size of from 2 to 15 µm, and more preferably from 4 to 8 µm. The average pore diameter of less than 2 µm may result in excessively higher electric resistivity. The average pore diameter of more than 15 µm may result in excessively lower electric resistivity. The average pore size is a value measured by a mercury porosimeter.

The shape of each cell 12 in a cross section of each cell orthogonal to a flow path direction is not limited, but it may preferably be a square, a hexagon, an octagon, or a combination thereof. Among these, the square and hexagonal shapes are preferable. Such a cell shape leads to a decreased pressure loss when an exhaust gas flows through the honeycomb structure 10, and improved purification performance of the catalyst.

The outer shape of the honeycomb structure 10 is not particularly limited as long as it presents a pillar shape, and it may be, for example, a shape such as a pillar shape with circular bottoms (cylindrical shape), a pillar shape with oval shaped bottoms, and a pillar shape with polygonal (square, pentagonal, hexagonal, heptagonal, octagonal, and the like) bottoms, and the like. Further, for the size of the honeycomb structure 10, the honeycomb structure preferably has an area of bottom surfaces of from 2000 to 20000 mm$^2$, and more preferably from 4000 to 10000 mm$^2$, in terms of increasing heat resistance (preventing cracks generated in a circumferential direction of the outer peripheral side wall). Further, an axial length of the honeycomb structure 10 is preferably from 50 to 200 mm, and more preferably from 75 to 150 mm, in terms of increasing the heat resistance (preventing cracks generated in a direction parallel to a central axis direction on the outer peripheral side wall).

Further, the honeycomb structure 10 can be used as a catalyst support by supporting a catalyst on the honeycomb structure 10.

Production of the honeycomb structure can be carried out in accordance with a method for making a honeycomb structure in a known method for producing a honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 µm, and more preferably from 3 to 40 µm. The average particle diameter of the metallic silicon particles in the metallic silicon powder is preferably from 2 to 35 µm. The average particle diameter of each of the silicon carbide particles and the metallic silicon particles refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure is the silicon-silicon carbide composite material. In the case where the material of the honeycomb structure is silicon carbide, no metallic silicon is added.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 µm. If it is less than 10 µm, pores may not be sufficiently formed. If it is more than 30 µm, a die may be clogged with the pore former during forming. The average particle size of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is dried. When the length in the central axis direction of the honeycomb structure is not the desired length, both the end faces of the honeycomb structure can be cut to the desired length.

(2. Electrode Layer)

As shown in FIG. 2, the outer peripheral wall of the honeycomb structure 10 according this embodiment is provided with a pair of electrode layers 13a, 13b. Each of the electrode layers 13a, 13b is formed into a strip shape extending in the extending direction of the cell 12 of the honeycomb structure 10. In a cross section orthogonal to the extending direction of the cell 12, one electrode layer of the pair of electrode layers 13a, 13b is disposed on a side opposite to the other electrode layer across a center of the honeycomb structure 10. Such a configuration allows suppression of any bias of a current flowing in the honeycomb structure 10 and suppression of any bias of a temperature distribution in the honeycomb structure 10 when a voltage is applied.

The electrode layers 13a, 13b are formed of a material having conductivity. It is preferable that each of electrode layers 13a, 13b is mainly based on silicon carbide particles and silicon, and it is more preferable that each of the electrode layers 13a, 13b is formed using silicon carbide particles and silicon as raw materials except for impurities that are usually contained. As used herein, the phrase "mainly based on silicon carbide particles and silicon" means that the total mass of silicon carbide particles and silicon is 90% by mass or more of the mass of the entire electrode layers. Thus, each of the electrode layers 13a, 13b is mainly based on silicon carbide particles and silicon, whereby components of each of the electrode layers 13a, 13b and components of the honeycomb structure 10 are the same as or close to each other (which is a case where the material of the honeycomb structure is silicon carbide). Therefore, thermal expansion coefficient values of the electrode layers 13a, 13b and the honeycomb structure will be the same as or close to each other. Further, since the materials are the same as or close to each other, a bonding strength between the electrode layers 13a, 13b and the honeycomb structure 10 is also increased. Therefore, even if thermal stress is applied to the honeycomb structure, it is possible to prevent the electrode layers 13a, 13b from peeling off from the honeycomb structure 10 or joint portions between the electrode layers 13a, 13b and the honeycomb structure 10 from being broken.

Further, as shown in FIG. 2, the honeycomb structure 10 includes a pair of electrode portions 14a, 14b, which are electrically connected to the respective electrode portions 14a, 14b via the electrode layers 13a, 13b and the base layers 16. Here, each of the electrode portions 14a, 14b has two or more electrodes 15 (see also FIG. 3), and each electrode is fixed to outer surfaces of the base layers 16. According to arrangement, when a voltage is applied through the electrode layers 13a, 13b, the metal electrode portions 14a, 14b can be energized to cause the honeycomb structure 10 to generate heat by Joule heat. Therefore, the honeycomb structure 10 can be suitably used as a heater. The applied voltage is preferably from 12 to 900 V, and more preferably 64 to 600 V. However, the applied voltage may be changed as needed.

(3. Base Layer)

Each base layer 16 has conductivity. The base layers 16 can be formed on a surface of each of the electrode layers 13a, 13b by thermal spraying and each base layer 16 is formed in a substantially flat plate shape (specifically, a curved shape so as to be along the outer surface of each of the electrode layers 13a, 13b). Each base layer 16 is provided on a part of the outer surface of each of the electrode layers 13a, 13b. Each base layer 16 can be formed of a metal material (e.g., a NiCr-based material) having a thermal expansion coefficient between a thermal expansion coefficient of the electrode layers 13a, 13b (a linear expansion coefficient of the electrode layers 13a, 13b is relatively low) and a thermal expansion coefficient of the electrodes 15 (a linear expansion coefficient of the electrode portions 14a, 14b are relatively high), so that each base layer has a function of absorbing a thermal expansion difference generated between each of the electrode layers 13a, 13b and each of the electrodes 15.

Here, it is important to form two or more base layers which are spaced apart from each other on each surface of the electrode layers 13a, 13b. As described above, when base layers are formed on the entire area where the electrode is fixed, a temperature difference will occur between the base layer on which the electrode is fixed and the base layer on which the electrode is not fixed, which causes a problem that cracks are generated in the base layers. Therefore, by providing the base layers in ranges required for fixing the electrode 15, rather than by forming the base layers over the entire region for fixing the electrode 15, the base layers are spaced apart from each other, thereby alleviating a temperature difference between the base layer on which the electrode is fixed and the base layer on which the electrode is not fixed, and enabling cracking of the base layers to be effectively suppressed.

Although FIG. 2 shows an embodiment where two base layers 16 are formed on the outer surface of each of the electrode layers 13a, 13b, two or more base layers 16 may be formed so as to be spaced apart from each other, and the number of base layers is not limited and may be appropriately set within a range required for fixing the electrode 15.

Each base layer 16 may be formed over a range required for fixing the electrode 15, and its shape is not limited. However, in terms of productivity and practicality, a contact surface between each base layer 16 and the electrode is preferably circular or rectangular.

FIG. 3 is a view showing the structure for the outer peripheral surface of the support for the electrical heating type catalyst in a direction orthogonal to the cross section in FIG. 2. For the sake of explanation, the electrode portions 14a, 14b and the electrodes 15 are not shown. When the contact surface between each base layer 16 and the electrode 15 is circular, a pitch A between the base layers and a diameter B of each base layer satisfy the relationship $B/A \leq 0.9$. As used herein, the pitch A between the base layers refers to a distance between centers of circle for the adjacent base layers 16. The ratio B/A of 0.9 or less can allow the base layers to be sufficiently separated from each other, so that the temperature difference is further relaxed between the base layer on which the electrode is fixed and the base layer on which the electrode is not fixed. From this viewpoint, the ratio B/A is more preferably 0.7 or less.

FIG. 4 shows an embodiment where the shape of each base layer 16 is changed to a rectangle from the embodiment in FIG. 3. When a contact surface between the base layer 16 and the electrode 15 is rectangular, a pitch A between the base layers and a long side C of each of the base layers satisfy the relationship: $C/A \leq 0.9$. As used herein, the pitch A between the base layers refers to a distance between intersections of the respective diagonal lines of the adjacent base layers 16. The ratio C/A of 0.9 or less can allow the base layers to be sufficiently separated from each other, so that the temperature difference is further relaxed between the base layer on which the electrode is fixed and the base layer on which the electrode is not fixed. From this viewpoint, the ratio C/A is more preferably 0.7 or less.

Further, the thickness of the base layer 16 can be set so as to achieve both reduction of thermal stress between each of the electrode layers 13a, 13b and each the electrodes 15, and a conduction efficiency.

When each electrode 15 is fixed to outer surfaces of the base layers 16 by fixing layers 17 as described below, each base layer 16 preferably has a surface roughness Ra of 3 μm or more, in terms of obtaining a bonding strength between each of the fixing layers 17 and each of the base layers 16.

(4. Electrode Portion)

For the electrode portions 14a, 14b, metals and ceramics can be used. Examples of the metals include, but not limited to, representatively, silver, copper, nickel, gold, palladium, silicon, and the like, in terms of ease of availability. It is also possible to use carbon. Non-limiting examples of ceramics include ceramics containing at least one of Si, Cr, B, Fe, Co, Ni, Ti and Ta, and illustratively, silicon carbide, chromium silicide, boron carbide, chromium boride, and tantalum silicide. Composite materials may be formed by combining the metals with the ceramics.

Each of the electrode portions 14a, 14b has two or more electrodes 15, and each electrode 15 is fixed to the outer surfaces of the base layers 16. Here, each electrode 15 may be fixed to the base layers 16 by welding, or may be fixed to the base layers 16 through the fixing layers 17 formed by thermal spraying, which will be described below (see FIG. 6).

In the embodiment shown in FIG. 5, each of the electrode portions 14a, 14b has three comb-shaped electrodes 15, and each electrode 15 is fixed to two base layers 16. As described above, the electrical connection between the comb-shaped electrodes 15 and the electrode layers 13a, 13b is realized by two or more base layers 16 that are spaced apart from each other.

It should be noted that in this embodiment, each electrode is formed in a comb shape, but any shape may be adopted as long as the electrode can be fixed to the base layers and can be electrically connected to the electrode layer.

(5. Fixing Layer)

In another embodiment of the present invention, each electrode 15 is fixed to the outer surfaces of the base layers 16 by fixing layers 17 (see FIG. 6). Each fixing layer 17 is bonded to both the electrode 15 and the base layer 16, whereby the electrode layers 13a, 13b are electrically connected to the electrode portions 14a, 14b. In this case, since the electricity can be conducted via each fixing layer, each electrode 15 may not be in direct contact with the base layers 16.

Each fixing layer 17 is made of a metal material (for example, a NiCr-based material or a CoNiCr-based material) having a thermal expansion coefficient between a thermal expansion coefficient of the electrode 15 and a thermal expansion coefficient of the base layer 16, and has conductivity. The fixing layers 17 are provided so as to be scattered at a plurality of positions on the surfaces of the comb-shaped electrodes 15 and the base layers 16, and are locally bonded to the comb-shaped electrodes 15 and the base layers 16. In the embodiment of FIG. 6, the surface area of the fixing layers 17 is smaller than that of the base layers 16.

Each of the fixing layers 17 is formed in a hemispherical shape on the surfaces of the comb-shaped electrodes 15 and the base layers 16. Each fixing layer 17 has a diameter larger than a line width x of each comb-shaped electrode 15. An apex of each of the fixing layers 17 is located on a center line of each comb-shaped electrode 15, so that each fixing layer 17 is formed so as to link the comb-shaped electrode 15 to surface sites located on both sides of the base layer 16 along the comb-shaped layer 15 in a direction orthogonal to the longitudinal direction of the comb-shaped electrode 15. That is, each of the fixing layers 17 is bonded to each comb-shaped electrode 15, and also bonded to the surface sites of the base layer 16 located on both sides in the direction orthogonal to the longitudinal direction of the comb-shaped electrode 15 across the comb-shaped electrode 15.

Both side surfaces of each comb-shaped electrode 15 facing the direction orthogonal to the longitudinal direction are covered with the fixing layer 17. The bonding of the comb-shaped electrodes 15 and the base layers 16 by the fixing layers 17 is achieved by thermally spraying the fixing layers 17 from an upper side of the electrode portion 14a or 14b placed on the base layers 16 toward the center of the comb-shaped electrode 15.

A plurality of fixing layers 17 (two fixing layers in FIG. 6) are provided per one comb-shaped electrode 15 of the electrode portion 14a or 14b, and are disposed at positions spaced apart from each other. Each comb-shaped electrode 15 is locally bonded to the fixing layers 17 at a plurality of positions spaced apart from each other. Each comb-shaped electrode 15 is fixed to the electrode layer 13a or 13b by locally bonding the fixing layers 17 to the comb-shaped electrode 15 and the base layers 16 at a plurality of positions spaced apart from each other. The fixing layers 17 are disposed at oblique positions on the surfaces of the base layers 16, in the comb-shaped electrodes 15 adjacent to each other, which are arranged in the axial direction of the electrode layer 13a or 13b.

It should be noted that in the embodiment having the fixing layers 17, other configurations of the support for the electric heating type catalyst are common to the above embodiment.

EXAMPLES

Hereinafter, Examples is illustrated for better understanding of the present invention and its advantages, but the present invention is not limited to these Examples.

(1) Production of Honeycomb Dried Body

Silicon carbide (SiC) powder and metallic silicon (Si) powder were mixed in a mass ratio of 60:40 to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide powder (SiC) and the metallic silicon (Si) powder was 100 parts by mass. The content of the pore former was 3 parts by mass when the total of the silicon carbide powder (SiC) and the metallic silicon (Si) powder was 100 parts by mass. The content of water was 42 parts by mass when the total of the silicon carbide powder (SiC) and the metallic silicon (Si) powder was 100 parts by mass. The average particle diameter of the silicon carbide powder was 20 μm, and the average particle diameter of the metallic silicon powder was 6 μm. The average particle diameter of the pore former was 20 μm. The average particle diameter of each of the silicon carbide powder, the metallic silicon powder and the pore former refers to an arithmetic mean diameter on volume basis, when measuring frequency distribution of a particle size by the laser diffraction method.

The resulting pillar shaped green body was formed using an extruder to obtain a pillar shaped honeycomb formed body in which each cell had a square cross-sectional shape. The resulting honeycomb formed body was subjected to high-frequency dielectric heating and drying and then dried at 120° C. for 2 hours using a hot air drier, and a predetermined amount of both end faces were cut to prepare a honeycomb dried body.

(2) Formation of Electrode Layer

Silicon carbide (SiC) powder and metallic silicon (Si) powder were mixed in a mass ratio of 60:40 to prepare a ceramic raw material. To the ceramic raw material were then added hydroxypropyl methyl cellulose as a binder, water and a surfactant to form a forming raw material. The forming raw material was then kneaded by means of a kneader to prepare a paste raw material. The content of the binder was 2 parts by mass when the total of the silicon carbide (SiC) powder and the metallic silicon (Si) powder was 100 parts by mass. The content of water was 40 parts by mass when the total of the silicon carbide (SiC) powder and the metallic silicon (Si) powder was 100 parts by mass. The content of the surfactant was 2 parts by mass when the total of the silicon carbide (SiC) powder and the metallic silicon (Si) powder was 100 parts by mass. The average particle diameter of the silicon carbide powder was 20 μm, and the average particle diameter of the metallic silicon powder was 6 μm, as measured by the laser diffraction method. The average particle diameter of each of the silicon carbide powder and the metallic silicon powder refers to an arithmetic mean diameter on volume basis, when measuring frequency distribution of a particle size by the laser diffraction method.

The paste raw material was applied to a honeycomb dried body so as to have an appropriate area and a film thickness by means of a curved surface printing machine, and further dried with a hot air drier at 120° C. for 30 minutes and then dried together with the honeycomb dried body in an Ar atmosphere at 1400° C. for 3 hr to obtain a honeycomb fired body.

(3) Formation of Base Layer

Metal powder (metal powder such as a NiCr-based material and stainless steel) and oxide powder (oxide powder of Cd, alumina, mullite or the like) were mixed at a metal ratio of from 20 to 85% in volume ratio and at a proportion of the oxide powder of from 15 to 80% to prepare a ceramic raw material. To the ceramic raw material were added 1% by mass of a binder, 1% by mass of a surfactant, and from 20 to 40% by mass of water to prepare a paste raw material. The average particle diameter of the metal powder was 10 μm and the average particle diameter of the oxide powder was 5 μm, as measured by the laser diffraction method.

The paste raw material was applied to the honeycomb fired body so as to have the arrangement shown in Table 1 by a curved surface printing machine and further dried at 120° C. for 30 minutes with a hot air drier, and then dried in an Ar atmosphere at 1100° C. for 1 hr.

(4) Surface Roughness Ra of Base Layer

Each honeycomb structure of each of Comparative Examples and Examples was cut out to prepare a cut product having 30×30×70 mm, and the base layer paste raw material described above was printed so as to have a thickness of 0.5 mm in an area having 20 mm×50 mm, and a surface roughness was measured with a contact type surface roughness tester. As the measurement conditions, a measurement distance was 15 mm, an approach running distance (an accelerating portion of a contact portion before measurement) was 0.3 mm, and a measurement speed was 0.25 mm/sec.

(5) Fixing of Electrode i. Fixing Method by Thermal Spraying:

On each honeycomb structure having a plurality of base layers formed by the above method, comb-shaped electrodes were arranged, and a spraying mask with holes formed in accordance with the position of each base layer was placed on the honeycomb structure. A thermal spraying material was thermally sprayed from an upper side of the spraying mask such that the surface was covered so as to be thermally sprayed only on the base layers. In this case, a mixed thermal spraying material of CoCrAlY and mullite was deposited from an upper side of the comb-shaped electrodes arranged on the base layers to form fixing layers, thereby fixing each electrode layer of the comb-shaped electrodes to outer surfaces of the base layers. It should be noted that since each electrode portion is electrically connected to the base layers through the fixing layers, it is not necessary to directly contact each electrode with the base layers.

ii. Fixing Method by Welding:

Comb-shaped electrodes were placed on each honeycomb structure having a plurality of base layers formed by the above method, and then laser-welded with a diameter of 0.5 mm on portions where each comb-shaped electrode overlapped with the base layers.

(6) Metal Electrode Fixing Test

A metal electrode fixing test was performed on each honeycomb structure having a pair of electrodes fixed by the above method. The metal electrode fixation test was performed for 20 seconds by applying a voltage of 50 V between the pair of comb-shaped electrodes. For an example of the fixing method by thermal spraying, the presence or absence of cracks/breaks among each base layer, each sprayed layer and each comb-shaped electrode were visually confirmed, and for an example of the fixing method by welding, the presence or absence of cracks/breaks between each base layer and each comb-shaped electrode was visually confirmed. When there was no crack/break, then it was evaluated as "Bonding OK".

[Table 1]

| | Base Layer Shape | Base Layer Arrangement | Base Layer RA (μm) | Fixing Method | A (mm) | B or C (mm) | B/A or C/A | Metal Electrode Fixing Test Result (Number of Bonding OK Samples/Number of Samples) |
|---|---|---|---|---|---|---|---|---|
| Comparative Example 1 | Circular | Adjacent | 2.3 | Thermal Spraying | — | — | — | 1/20 |
| Comparative Example 2 | Circular | Adjacent | 2.3 | Thermal Spraying | 5 | 5 | 1.0 | 2/20 |
| Example 2 | Circular | Spaced | 4.3 | Thermal Spraying | 5.5 | 5 | 0.9 | 18/20 |
| Example 3 | Circular | Spaced | 4.3 | Thermal Spraying | 7.2 | 5 | 0.7 | 20/20 |
| Example 4 | Circular | Spaced | 4.3 | Thermal Spraying | 10 | 5 | 0.5 | 20/20 |
| Example 5 | Rectangular | Spaced | 4.3 | Thermal Spraying | 5.5 | 5 | 0.9 | 17/20 |
| Example 6 | Circular | Spaced | 4.3 | Welding | 7.2 | 5 | 0.7 | 20/20 |

(Discussion)

From the results shown in Table 1, it is understood that Examples effectively suppress cracks as compared with Comparative Example. In particular, when the contact surface between each base layer and the electrode was circular or rectangular, the results of the metal electrode fixation test were all OK if the ratio B/A or C/A was 0.7 or less. It is understood that the base layers are spaced apart from each other, whereby the local temperature difference is alleviated and the generation of cracks/breaks is prevented.

On the other hand, since Comparative Example 1 formed two base layer on the surface of each of the electrode layers 13a, 13b, a large number of cracks/breaks was generated. Comparative Example 2 formed only one base layer on the surface of each of the electrode layers 13a, 13b, but the base layers were adjacent to each other, so that the effect of alleviating the local temperature difference was insufficient, and a large number of cracks/breaks was generated.

DESCRIPTION OF REFERENCE NUMERALS

10 . . . honeycomb structure
11 . . . partition wall
12 . . . cell
13a, 13b . . . electrode layer
14a, 14b . . . electrode portion
15 . . . electrode
16 . . . base layer
17 . . . fixing layer

What is claimed is:

1. A support for an electric heating type catalyst, comprising:
   a honeycomb structure having:
   porous partition walls extending through the honeycomb structure from an inflow end face to an outflow end face to define a plurality of cells forming a through channel;
   an outer peripheral wall located at the outermost periphery;
   a pair of electrode layers disposed on the outer peripheral wall of the honeycomb structure; and
   a pair of electrode portions,
   wherein each of the electrode layers is formed in a strip shape extending in an extending direction of the cells of the honeycomb structure,
   wherein, in a cross section orthogonal to the extending direction of the cell, one electrode layer of the pair of electrode layers is disposed on a side opposite to the other electrode layer across a center of the honeycomb structure,
   wherein each of the electrode layers is electrically connected to each of the electrode portions via two or more base layers, the base layers having conductivity and being spaced apart from each other, and
   wherein each of the electrode portions comprises two or more electrodes, each of the electrodes being fixed to outer surfaces of the base layers.

2. The support for the electrical heating type catalyst according to claim 1, wherein a contact surface between each of the base layers and the electrode is circular, and a pitch A between the base layers and a diameter B of each of the base layers satisfy the relationship: $B/A \leq 0.9$.

3. The support for the electric heating type catalyst according to claim 2, wherein the pitch A between the base layers and the diameter B of each of the base layers satisfy the relationship: $B/A \leq 0.7$.

4. The support for the electric heating type catalyst according to claim 1, wherein a contact surface between each of the base layers and the electrode is rectangular, and a pitch A between the base layers and a long side C of each of the base layers satisfy the relationship: $C/A \leq 0.9$.

5. The support for the electric heating type catalyst according to claim 4, wherein the pitch A between the base layers and the long side C of each of the base layers satisfy the relationship: $C/A \leq 0.7$.

6. A support for an electric heating type catalyst, comprising:
   a honeycomb structure having:
   porous partition walls extending through the honeycomb structure from an inflow end face to an outflow end face to define a plurality of cells forming a through channel;
   a pair of electrode layers disposed on the outer peripheral wall of the honeycomb structure; and
   a pair of electrode portions,
   wherein each of the electrode layers is formed in a strip shape extending in an extending direction of the cell of the honeycomb structure,
   wherein, in a cross section orthogonal to the extending direction of the cell, one electrode layer of the pair of electrode layers is disposed on a side opposite to the other electrode layer across a center of the honeycomb structure,
   wherein each of the electrode layers is electrically connected to each of the electrode portions via two or more base layers, the base layers having conductivity and being spaced apart from each other, and
   wherein each of the electrode portions comprises two or more electrodes, each of the electrodes being fixed to outer surfaces of the base layers by fixing layers.

7. The support for the electrical heating type catalyst according to claim 6, wherein a contact surface between each of the base layers and the electrode is circular, and a pitch A between the base layers and a diameter B of each of the base layers satisfy the relationship: $B/A \leq 0.9$.

8. The support for the electric heating type catalyst according to claim 7, wherein the pitch A between the base layers and the diameter B of each of the base layers satisfy the relationship: $B/A \leq 0.7$.

9. The support for the electric heating type catalyst according to claim 6, wherein a contact surface between each of the base layers and the electrode is rectangular, and a pitch A between the base layers and a long side C of each of the base layers satisfy the relationship: $C/A \leq 0.9$.

10. The support for the electric heating type catalyst according to claim 9, wherein the pitch A between the base layers and the long side C of each of the base layers satisfy the relationship: $C/A \leq 0.7$.

11. The support for the electric heating type catalyst according to claim 6, wherein each of the base layers has a surface roughness Ra of 3 μm or more.

* * * * *